(12) United States Patent
Govindassamy et al.

(10) Patent No.: US 9,888,415 B1
(45) Date of Patent: Feb. 6, 2018

(54) METHOD AND APPARATUS FOR CELL RESELECTION

(71) Applicant: MBIT WIRELESS, INC., Irvine, CA (US)

(72) Inventors: Sivakumar Govindassamy, Irvine, CA (US); Senthamizhselvan Pougajendy, Puducherry (IN)

(73) Assignee: MBIT WIRELESS, INC., Irvine, CA (US)

( * ) Notice: Subject to any disclaimer, the term of this patent is extended or adjusted under 35 U.S.C. 154(b) by 0 days.

(21) Appl. No.: 15/606,347

(22) Filed: May 26, 2017

(51) Int. Cl.
*H04W 36/00* (2009.01)
*H04W 36/14* (2009.01)
*H04W 24/02* (2009.01)

(52) U.S. Cl.
CPC ....... *H04W 36/0094* (2013.01); *H04W 24/02* (2013.01); *H04W 36/0088* (2013.01); *H04W 36/14* (2013.01)

(58) Field of Classification Search
CPC ..... H04W 36/36; H04W 36/04; H04W 24/10; H04W 72/0426; H04W 92/20; H04W 76/028; H04W 76/046; H04W 68/02; H04L 27/28; H04L 1/20; H04L 1/0026; H04J 11/005; H04J 11/0076
USPC ............ 370/328, 312; 455/422.1, 452.1, 437
See application file for complete search history.

(56) References Cited

U.S. PATENT DOCUMENTS

2016/0366627 A1\* 12/2016 Yang ...................... H04W 36/14
2017/0111886 A1\* 4/2017 Kim ..................... H04W 72/042

\* cited by examiner

*Primary Examiner* — Phuoc H Doan
(74) *Attorney, Agent, or Firm* — Lerner, David, Littenberg, Krumholz & Mentlik, LLP

(57) ABSTRACT

In a wireless communication system, by making measurements on the signal conditions of the serving cell and neighbor cells, a client terminal may make cell reselection according to the criteria specified in the system information of the serving cell. Upon reselection to a target cell, if the client terminal needs to establish connection with the network, then it may have to first receive the broadcast system information in its new serving cell. A method and apparatus are disclosed that reduce connection establishment delay, after a client terminal performs cell reselection, by acquiring the broadcast system information of the target cell before the cell reselection.

26 Claims, 7 Drawing Sheets

METHOD AND APPARATUS FOR CELL RESELECTION

BACKGROUND

Typically, as shown in FIG. 1, a wireless communication system comprises elements such as client terminals or mobile stations and one or more base stations. Other network devices may also be employed, such as a mobile switching center (not shown). As illustrated in FIG. 1, the communication path from the base station (BS) to the client terminal or mobile station (MS) is referred to herein as a downlink (DL) direction or downlink channel, and the communication path from the client terminal to the base station is referred to herein as an uplink (UL) direction or uplink channel. In some wireless communication systems, the MS communicates with the BS in both the DL and UL directions. For instance, such communication is carried out in cellular telephone systems. In other wireless communication systems, the client terminal communicates with the base stations in only one direction, usually the DL. Such DL communication may occur in applications such as paging. As used herein, the terms "base station" and "network" are used interchangeably.

Normally, the transmission intervals in the downlink channel or in the uplink channel span certain predefined duration and it is referred to as "frame" herein. Frame duration may be different for different communication systems and normally it is on the order of a few milliseconds. For example, the frame duration may be five milliseconds. Typically in a wireless communication system, the client terminal and the base station may transmit information in blocks of data and such a block of data is referred to herein as a "message."

A base station to which the client terminal may be downlink synchronized and/or communicating with at any given time is referred to herein as the Serving Base Station (SBS). In some wireless communication systems the serving base station may be referred to as the serving cell. The base stations that are in the vicinity of the serving base station are called Neighbor Base Stations (NBS). Similarly, in some wireless communication systems a neighbor base station may be referred to as a neighbor cell.

A client terminal, after initially synchronizing with a cell, may switch to another cell depending on the signal conditions, network congestion, and other criteria. The process of switching from one cell to another cell by a client terminal is often referred to as handover (HO) or cell reselection. In some wireless communication systems handover is also referred to as handoff. Also in some wireless communication systems cell reselection is also referred to as idle mode handoff. An NBS, to which a client terminal may be switching over its communication from the current SBS, is herein referred to as Target Base Station (TBS). In some wireless communication systems, a target base station is normally referred to as a target cell. Sometimes, during a handover, the serving cell and the target cell may be the same and only the channel used for communication may be changed. Such a handover, in which the cell is not changed, is called an intra-cell handover. The purpose of intra-cell handover may be that the new channel is better suited for communication than the previous channel within the same cell. Cell reselections or handovers amongst cells that use the same frequency are referred to herein as intra-frequency cell reselection or handover. Cell reselections or handovers amongst cells that use different frequencies are referred to herein as inter-frequency cell reselection or handover.

The decision making process for handovers and cell reselections varies from one wireless communication system to another. However, the decisions are generally based on the signal conditions measurements by the client terminals and reporting of those measurements to the wireless communication network by the client terminals. The wireless communication network generally may influence and control the measurements and reporting process of the client terminal by providing parameters for the measurement and reporting process. The actual decision to perform handover may be made either by the wireless communication network or by the client terminal depending on the type of particular wireless communication system. On the other hand the cell reselection decisions in idle mode (i.e., when client terminal is not in active communication with the wireless communication network) may be generally performed autonomously by the client terminal. Both handovers and cell reselections may normally lead to change of cell from which the client terminal may access communication services. The difference between the handover procedure and cell reselection procedure depends generally on whether a client terminal is engaged in an active communication with the wireless communication network.

Normally, certain types of system information may be required by all client terminals so that they may communicate with the wireless communication network. The system information typically includes system synchronization information, system parameters, resource allocation information, paging information, etc. The wireless communication network may transmit such system information as broadcast data so that all client terminals within its coverage area may be able to receive the system information. Such information is herein referred to as "broadcast messages."

Typically in a wireless communication system a base station may group the system information and each group of system information may be transmitted as multiple broadcast messages and such broadcast messages are herein referred to as system parameter messages. The system parameter messages may carry important system information without which the client terminal may not be able to communicate with the wireless communication network. The wireless communication network may transmit these system parameter messages at regular intervals in such a way that any client terminal that enters its coverage area may receive these system parameter messages and may be able to communicate with the wireless communication network at the earliest possible time. Client terminals that are already in the base station's coverage area may also periodically receive these system parameter messages for possible updates. Normally a client terminal may store the system parameter messages in its memory for the current SBS.

Typically, in wireless communication systems, most of the system parameter messages may not change frequently. For example, some system parameter messages may change once or twice a day and some system parameter messages may not change for many days.

In some wireless communication systems, when a client terminal switches to a new base station due to cell reselection or handover, it may be required to receive the system parameter messages for the new SBS and certain system parameter messages for the selective list of NBSs corresponding to the new SBS.

The set of all system parameter messages broadcast by a base station is herein referred to as "base station broadcast system information." The individual block of system information message may be referred to as System Information Block (SIB). Two or more SIBs may be grouped and sent as a single System Information (SI) message. There may be different SIBs describing different groups of system parameters such as SIB Type1 (SIB1), SIB Type2 (SIB2), etc.

Each base station in a wireless communication network may be identified by a unique identifier referred to herein as Cell Identity (CID). The CID of a base station may become known to a client terminal when it decodes SI from the base station. To avoid unnecessary updates from a client terminal and yet ensure the ability to reach a client terminal at any given time, the network may organize a group of cells into a "tracking area" and use a Tracking Area Identity (TAI) to identify the various groups of cells. This is illustrated in FIG. 2 where four different tracking areas are illustrated. A cell may broadcast information about the tracking area it belongs to by including the TAI information in the SI. A client terminal may be required to inform the network when it begins to receive service from a cell that belongs to a tracking area that is different from the tracking area of the cells from which it was previously receiving service. The process of informing the network that the client terminal has begun receiving service from a cell that belongs to a new tracking area is referred herein as Tracking Area Update (TAU) procedure. With this method, a client terminal performs TAU only when there is a change in TAI of the cell from which it is getting service. For example, in FIG. 2, when a client terminal reselects from the cell with CID=1003 to the cell with CID=1007 which has the same TAI, it may not perform TAU procedure. However, when the client terminal reselects from the cell with CID=1007 and TAI=200 to the cell with CID=1012 and TAI=201, it may perform TAU procedure.

A client terminal may need to initiate the connection establishment procedure with the wireless communication network using the system parameters provided from SIBs to access the common control channels, such as Random Access Channel (RACH), Random Access Response, etc., in its current serving cell under different example conditions as follows: (i) when a client terminal performs cell reselection to a cell not belonging to a tracking area in its set of registered tracking areas, (ii) when there is a need for periodic TAU after cell reselection due to its periodic timer expiry, (iii) if a client terminal receives a mobile terminated call, and (iv) when a user initiates a mobile originated call. In case of a 3rd Generation Partnership Project (3GPP) Long Term Evolution (LTE) wireless communication system, the common control channel parameters are provided in SIB2. Unless SIB2 is received for its current serving cell, a client terminal may not initiate its connection establishment procedure. Hence there may be a delay in the connection establishment procedure when the client terminal does not have a valid SIB2 for the cell. In different wireless communication systems, the common control channel parameters may be provided in different system information blocks.

SUMMARY

A method and apparatus are disclosed that may reduce connection establishment delay, after a client terminal performs cell reselection, by acquiring the broadcast system information of the target cell while remaining in the current serving cell. This in turn may improve user experience.

In accordance with an aspect of the present disclosure, a method for cell reselection in a wireless communication system may include controlling, by a processing device at a client terminal, at least one of when the client terminal does not have a valid System Information Block 2 (SIB2) for at least one Candidate Cell (CC) in a Candidate Cells List (CCL), determining to decode a given SIB2 for at least one given CC in the CCL while performing a predetermined cell reselection process, in which the CCL includes each identified neighbor cell of a current serving cell of the client terminal that satisfies cell reselection criteria as a result of a priority based cell reselection evaluation; or when the client terminal does not to have a valid SIB2 for at least one Better Candidate Cell (BCC) in a Better Candidate Cells List (BCCL), determining to decode a second given SIB2 for at least one given BCC in the BCCL while performing the predetermined cell reselection process, in which the BCCL includes each CC in the CCL that satisfies the cell reselection criteria consistently for the period $T_{ReselectionRAT}$.

In one alternative, the method may include controlling, by the processing device, at least one of maintaining a CCL for each given Evolved Absolute Radio Frequency Channel Number (EARFCN), wherein a number m of CC selected for SIB2 decode from the CCL of the each given EARFC is a same or different; or maintaining a BCCL for each of the given EARFCN, wherein a number m2 of BCC selected for SIB2 decode from the BCCL of the each given EARFC is a same or different, wherein the number m is different or same as the number m2.

In one alternative, the method may include controlling, by the processing device, performing SIB2 decoding for a plurality of given CC of the CCL while the client terminal remains in the current serving cell.

In one alternative, the method may include controlling, by the processing device, performing SIB2 decoding for a plurality of given BCCs of the BCCL while the client terminal remains in the current serving cell.

In one alternative, the method may include controlling, by the processing device, generating a new list of potential candidate cells for performing SIB2 decoding while the client terminal remains in the current serving cell.

In one alternative, the new list as SIB2DL may include cells from at least one given CCL or given BCCL for different ones of the EARFCNs.

In one alternative, the SIB2DL may have a size l equal to a number of cells for which the SIB2 decoding is performed, wherein a value $m_i$ of each of m and m2 is dynamically selected such that $m_i$=x % of l, and wherein x is a percentage for each available higher priority EARFCN and intra-frequency EARFCN.

In one alternative, the value $m_i$ may be rounded off to a nearest integer.

In one alternative, a value of x for a given intra-frequency EARFCN may be at least a predetermined value when the given intra-frequency EARFCN is of a plurality of given highest priority EARFCN.

In one alternative, a value of x may be in accordance with a number of inter-frequencies.

In one alternative, the SIB2DL may include a given cell from an equal priority EARFCN when a number of preferable candidates in a higher priority EARFCN is less than l.

In one alternative, the method may include controlling, by the processing device, prioritizing SIB2 decoding of given second cells within the SIB2DL based on predetermined information about the given second cells.

In one alternative, the method may include controlling, by the processing device, prioritizing SIB2 decoding using predetermined information about given second cells (i) not in the SIB2DL and (i) in the BCCL or CCL and belonging to at least one of a same EARFCN, Public Land Mobile Network (PLMN) priority or Tracking Area of the cells in the SIB2DL.

In one alternative, the method may include controlling, by the processing device, SIB2 decoding cells in the SIB2DL by determining a first order priority for a second cell belonging to a same Radio Access Technology RAT, a home Public Land Mobile Network (PLMN), a same EARFCN and a same Tracking Area and having a better Reference Signal Received Power (RSRP) and Reference Signal Received Quality (RSRQ) among other cells in the SIB2DL.

In one alternative, the method may include controlling, by the processing device, recording, as recorded values, a best case time and worst case time to decode SIB2 in at least one of a given network signal condition or client terminal location; and from the recorded values, estimating a typical time required for SIB2 decoding.

In one alternative, the method may include controlling, by the processing device, determining to perform SIB2 decoding for only one targeted neighbor cell (TNC) in the SIB2DL as a next potential cell for reselection.

In one alternative, the SIB2 decoding for the TNC may be performed at a time T-T', wherein T is a time for the possible reselection trigger for the TNC and T' is a typical time required for performing SIB2 decoding in at least one of a given network signal condition or client terminal location for a given neighbor cell.

In one alternative, the method may include controlling, by the processing device, deciding to perform SIB2 decoding for l' neighbor cells in the SIB2DL before a next reselection trigger for a targeted neighbor cell (TNC) in the SIB2DL.

In one alternative, the SIB2 decoding may be started for the l' neighbor cells at a time equal to T−T'×l', wherein T is a time for the possible reselection trigger for the TNC and wherein T' is a typical time required for performing SIB2 decoding in at least one of a given network signal condition or client terminal location for a given neighbor cell.

In one alternative, the method may include controlling, by the processing device, using information received in a third given SIB2 for effective Discontinuous Reception (DRX) for a first DRX cycle after cell reselection.

In one alternative, the method may include controlling, by the processing device, using decoded SIB2 information of a given neighbor cell to determine whether the given neighbor cell is to be considered for reselection.

In one alternative, the method may include controlling, by the processing device, avoiding cell reselection to a cell which is barred for at least one network access type for the client terminal.

In one alternative, the method may include controlling, by the processing device, using access barring information in a third given SIB2 to decide to consider or reject a given neighbor cell for reselection.

In one alternative, the method may include controlling, by the processing device, when a third given SIB2 is decoded before reselection to another cell, starting using any scheduling information received in the third given SIB2 immediately after the reselection.

In accordance with an aspect of the present disclosure, an apparatus for cell reselection in a wireless communication system may include circuitry configured to control at a client terminal, at least one of when the client terminal does not have a valid System Information Block 2 (SIB2) for at least one Candidate Cell (CC) in a Candidate Cells List (CCL), determining to decode a given SIB2 for at least one given CC in the CCL while performing a predetermined cell reselection process, in which the CCL includes each identified neighbor cell of a current serving cell of the client terminal that satisfies cell reselection criteria as a result of a priority based cell reselection evaluation; or when the client terminal does not to have a valid SIB2 for at least one Better Candidate Cell (BCC) in a Better Candidate Cells List (BCCL), determining to decode a second given SIB2 for at least one given BCC in the BCCL while performing the predetermined cell reselection process, in which the BCCL includes each CC in the CCL that satisfies the cell reselection criteria consistently for the period $T_{ReselectionRAT}$.

In accordance with an aspect of the present disclosure, a wireless communication device may include a receiver to receive a wireless communication; and a processing device configured for cell reselection, wherein the processing device may be configured to control at least one of: when the wireless communication device does not have a valid System Information Block 2 (SIB2) for at least one Candidate Cell (CC) in a Candidate Cells List (CCL), determining to decode a given SIB2 for at least one given CC in the CCL while performing a predetermined cell reselection process, in which the CCL includes each identified neighbor cell of a current serving cell of the wireless communication device that satisfies cell reselection criteria as a result of a priority based cell reselection evaluation; or when the wireless communication device does not to have a valid SIB2 for at least one Better Candidate Cell (BCC) in a Better Candidate Cells List (BCCL), determining to decode a second given SIB2 for at least one given BCC in the BCCL while performing the predetermined cell reselection process, in which the BCCL includes each CC in the CCL that satisfies the cell reselection criteria consistently for the period $T_{ReselectionRAT}$.

DETAILED DESCRIPTION

Figure 1:
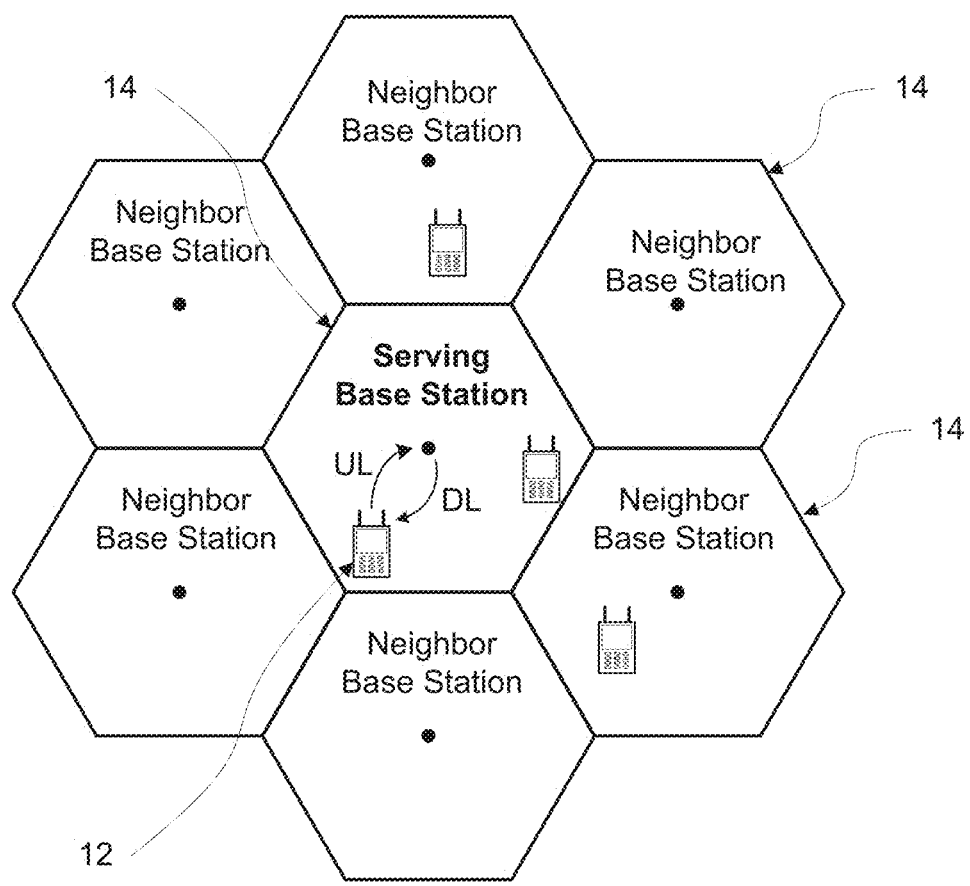
FIG. 1 illustrates a conventional mobile wireless communication system.
Figure 2:
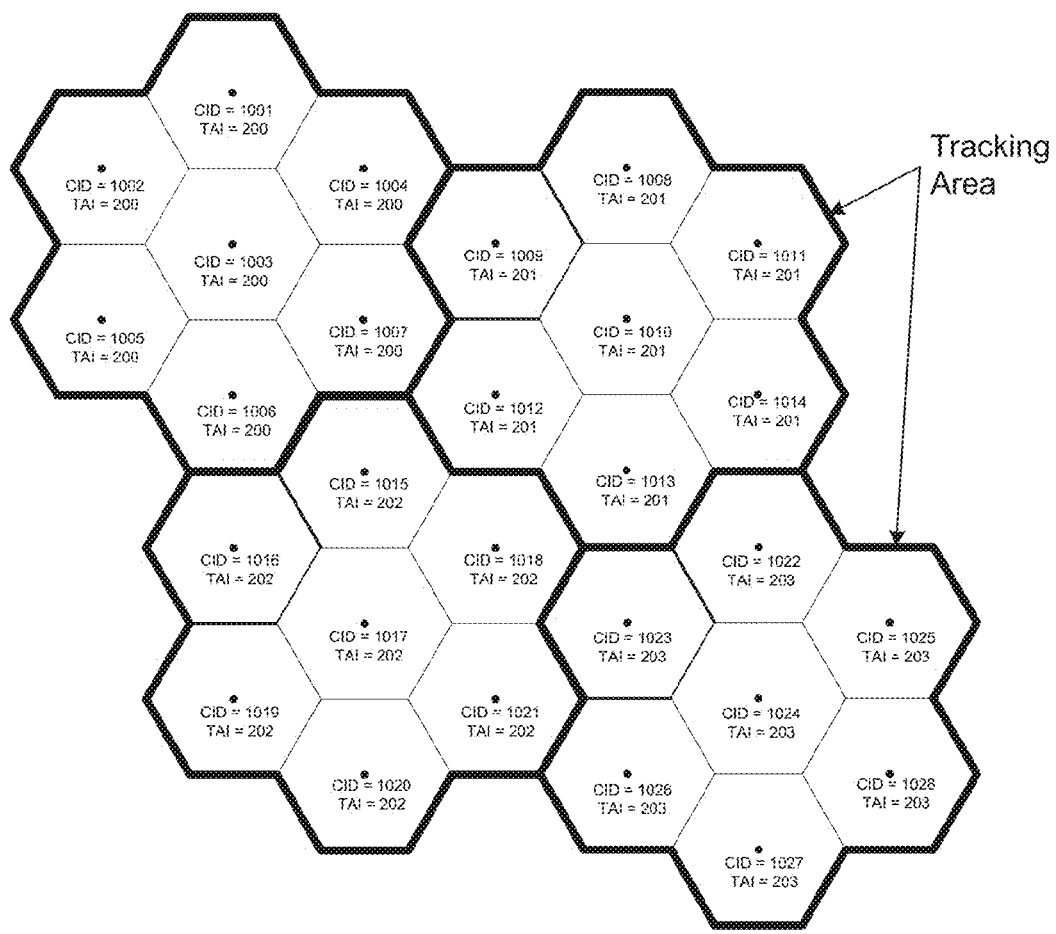
FIG. 2 illustrates the grouping of cells into tracking areas in a wireless communication system.

The foregoing aspects, features and advantages of the present disclosure will be further appreciated when considered with reference to the following description of exemplary embodiments and accompanying drawings, wherein like reference numerals represent like elements. In describing the exemplary embodiments of the disclosure illustrated in the appended drawings, specific terminology will be used for the sake of clarity. However, the disclosure is not intended to be limited to the specific terms used.

Various aspects of the present disclosure are described and illustrated herein for the case of 3GPP LTE wireless communication system, although the aspects described herein are applicable to other wireless communication systems.

Figure 3:
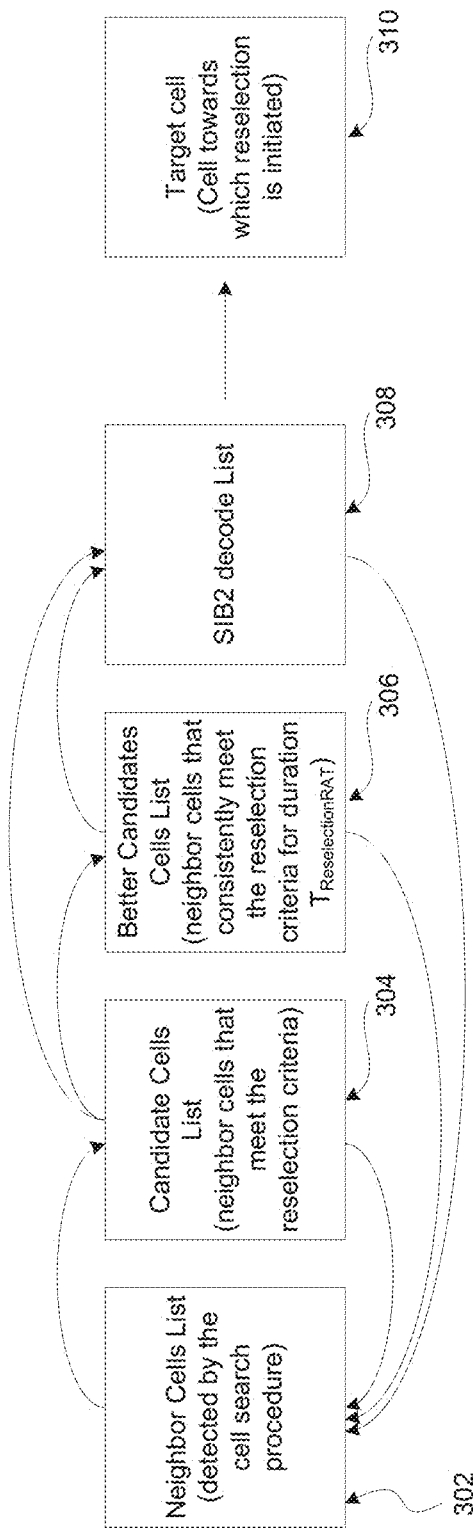
FIG. 3 illustrates the organization of neighbor cells into various lists according to the aspects of the present disclosure.

After camping on to a cell, in order to be ready for the possibility of cell reselection, a client terminal may perform measurements on neighbor cells specified in the neighbor cells frequency list which may be broadcast in the serving cell's SI messages. A frequency used by a cell in 3GPP LTE wireless communication system may be identified by the Evolved Absolute Radio Frequency Channel Number (EARFCN). There may be neighbor cells on each of the EARFCN broadcast in the SI messages of the serving cell. The detected neighbor cells may be grouped into different categories based on the following criteria as illustrated in FIG. 3:

Neighbor Cells (NCs)—cells that are identified by the neighbor cell search procedure on the frequencies determined from the SI of the serving cell. The list that contains the Neighbor Cells may be herein referred as "Neighbor Cells List" (NCL).

Candidate cells (CCs)—neighbor cells that satisfy the cell reselection criteria as a result of priority based cell reselection evaluation. The list that contains the Candidate cells may be herein referred as "Candidate Cells List" (CCL).

Better Candidate Cells (BCCs)—candidate cells that satisfy the cell reselection criteria consistently for the period $T_{ReselectionRAT}$. The period $T_{ReselectionRAT}$ may be known from the broadcast system information or it could be derived based on simulation. The list that contains the Better Candidate Cells may be herein referred as "Better Candidate Cells List" (BCCL).

SIB2 Decode List (SIB2DL)—the list that carries the final set of cells for which the client terminal may decode the SIB2. It may contain the list of highly preferable cells for cell reselection.

The maintenance of cells in the above categories may be performed as follows. A client terminal may perform neighbor cell search on all EARFCNs listed by the serving cell and may periodically measure its Reference Signal Received Power (RSRP) and Reference Signal Received Quality (RSRQ). The cells identified by the neighbor cell search procedure may be placed in the NCL 302 in FIG. 3. The cells in the NCL 302 may be evaluated using the cell reselection criteria as specified in 3GPP TS 36.304: "Evolved Universal Terrestrial Radio Access (E-UTRA); client terminal Procedures in Idle Mode." A wireless communication network, such as 3GPP LTE wireless communication system, may establish priorities for cell resection and these priorities may be communicated to client terminals through system information. For example, intra-frequency cell reselection may be higher priority than inter-frequency cell reselection. Neighbor cell EARFCNs may be designated as higher priority, equal priority or lower priority compared to serving cell's EARFCN. The cells that may satisfy the priority based cell reselection criteria are considered as Candidate Cells for cell reselection and are maintained in the CCL 304 in FIG. 3. The cells in the CCL may be periodically evaluated for duration, e.g., $T_{ReselectionRAT}$ in 3GPP LTE wireless communication system, and those that satisfy the cell reselection criteria for this duration may be moved to the BCCL 306 in FIG. 3. At any point in time, the cells in the CCL 304 or BCCL 306 that no longer satisfy cell reselection criteria or become undetectable at any moment, may be removed from the appropriate list. These rearrangements of cell information from one list to another are illustrated in FIG. 3.

Cell reselection to a cell may be performed depending on the RSRP and RSRQ measurements and the cell reselection criteria. The chosen cell for reselection is the target cell and at any moment the target cell related information may be retrieved from the CCL or BCCL.

According to an aspect of the present disclosure, if a client terminal does not have a valid SIB2 for one or more cells in the CCL then it may decide to decode the SIB2 for one or more of the cells in the CCL while continuing to follow all the required cell reselection criteria. This may help avoid delay in connection establishment in the target cell after cell reselection.

According to an aspect of the present disclosure, if a client terminal does not have a valid SIB2 for one or more cells in the BCCL then it may decide to decode the SIB2 for one or more of the cells in the BCCL while continuing to follow all the required cell reselection criteria. This may help avoid delay in connection establishment in the target cell after cell reselection.

In case the client terminal has a valid SIB2 for the candidate cell, the cell reselection and handover may be performed as described in "Method and Apparatus for Location Based Cell Reselection and Handovers", publication number US2015/0023190A1, incorporated by reference herein.

The client terminal may maintain separate CCL for each EARFCN and according to an aspect of the present disclosure, the value of m may be the same or different for different EARFCN's CCL. The client terminal may maintain separate BCCL for each EARFCN and according to an aspect of the present disclosure, the value of m may be the same or different for different EARFCN's BCCL. The value of m may be different for neighbor cells in CCL and BCCL.

According to an aspect of the present disclosure, the SIB2 decode may be performed for multiple CCs while remaining in the current serving cell. Let $m_{CC}$ be the number of top potential CCs chosen for SIB2 decode among the set of $n_{CC}$ CCs. The value of $m_{CC}$ may be implementation dependent and may be determined based on simulations or profiling. The value $m_{CC}$ may be configurable. In case if $m_{CC} \geq n_{CC}$, then neighbor SIB2 decode may be done for the entire CCL, i.e., for $n_{CC}$ cells. If $m_{CC} < n_{CC}$, then the potential $m_{CC}$ CCs to decode SIB2 may be chosen from $n_{CC}$ CCs considering various parameters and few such parameters could be the measured RSRP and RSRQ of the cell.

According to an aspect of the present disclosure, the SIB2 decode may be performed for multiple BCCs while remaining in the current serving cell. Let $m_{BCC}$ be the number of top potential BCCs chosen for SIB2 decode among the set of $n_{BCC}$ BCCs. The value of $m_{BCC}$ may be implementation dependent and may be determined based on simulations or profiling. The value $m_{BCC}$ may be configurable. In case if $m_{BCC} \geq n_{BCC}$, then neighbor SIB2 decode may be done for the entire BCCL, i.e., for $n_{BCC}$ cells. If $m_{BCC} < n_{BCC}$, then the potential $m_{BCC}$ BCCs to decode SIB2 may be chosen from $n_{BCC}$ BCCs considering various parameters and few such parameters could be the measured RSRP and RSRQ of the cell.

According to an aspect of the present disclosure the client terminal may form a new list of cells which could be the potential candidates to be considered for neighbor SIB2 decode while remaining in the current serving cell. The list that carries the final set of cells for which the client terminal may decode the SIB2 is referred herein as SIB2DL and it may contain the list of highly preferable candidates for cell reselection. Let the size of the SIB2DL be denoted by l. The size l may be implementation dependent and based on simulation results or profiling for client terminal's field performance. For example, the value of l may be in the range 1 to 5. One or more cells from CCL 304 and BCCL 306 may be selected for SIB2DL 308 in FIG. 3. Eventually, when cell reselection trigger occurs, a cell from SIB2DL 308 may become the target cell 310 in FIG. 3.

Figure 4:
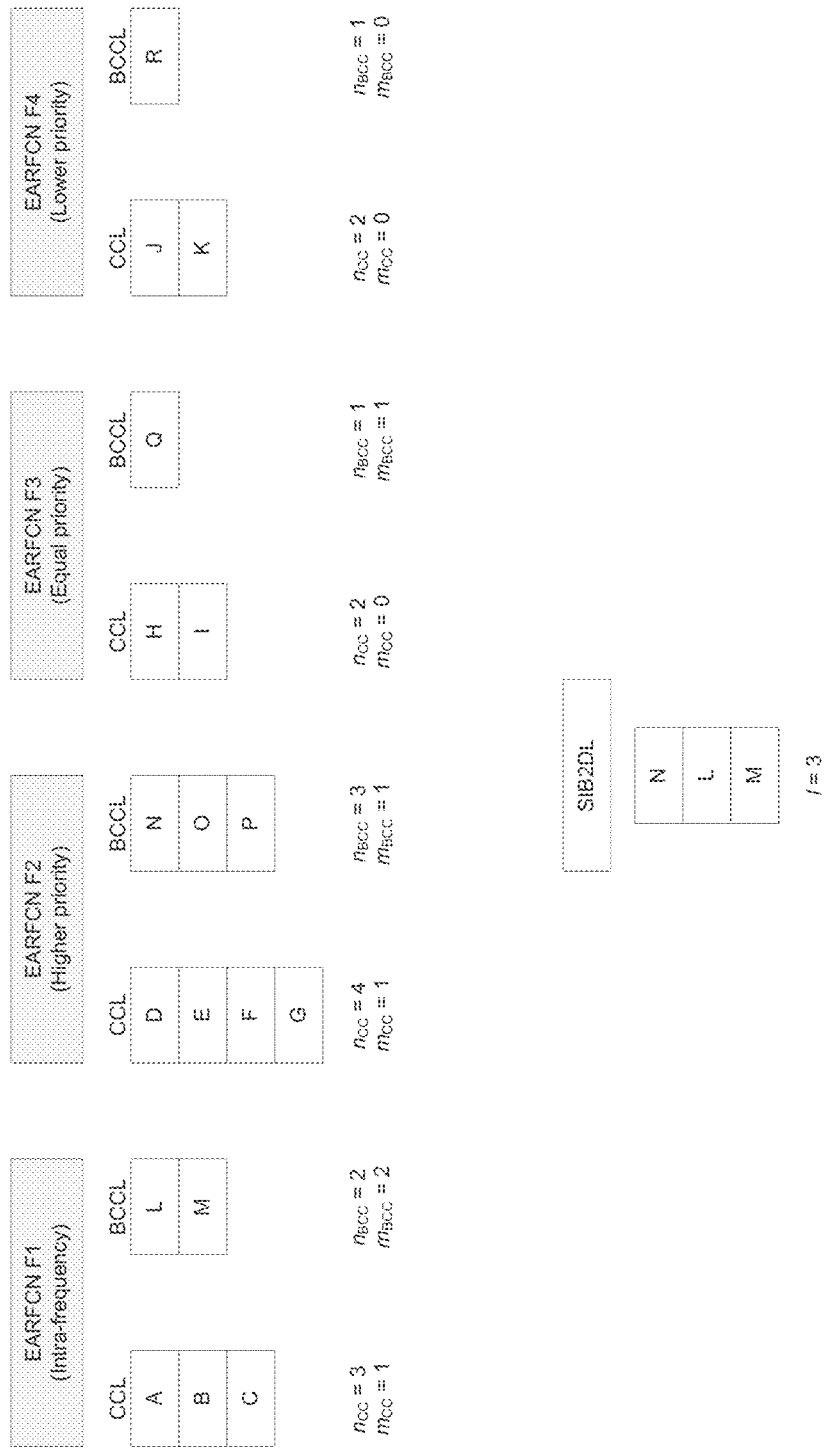
FIG. 4 illustrates an example scenario of neighbor cells and their organization into various lists according to the aspects of the present disclosure.

The various neighbor cells lists and their corresponding EARFCNs along with the priority and the parameters as per the aspects of the present disclosure are illustrated in FIG. 4 for an example case. Total of four EARFCNs are illustrated in FIG. 4. The EARFCN F1 corresponds to the frequency of the serving cell and therefore it is referred to as intra-frequency. For the EARFCN F1, in this example, the client terminal may have three cells in its CCL and two cells in its BCCL. The values of $n_{CC}$ and $n_{BCC}$ is 3 and 2 respectively for the CCL and BCCL in this example. Similarly, the values of $m_{CC}$ and $m_{BCC}$ is 1 and 2 respectively for the CCL and BCCL in this example. The EARFCN F2 is a higher priority EARFCN in this example. Similar to the EARFCN F1, the values for various parameters are illustrated for the EARFCN F2. Similar information is illustrated for EARFCN F3 which is designated as equal priority EARFCN and for EARFCN F4 which is designated as lower priority EARFCN. The number of cells for which the SIB2 decoding may be performed, i.e., size l of SIB2DL is selected to be 3 in this example. From all the cells detected for the four EARFCNs, only l=3 cells are selected for SIB2 decoding as illustrated in the bottom half of FIG. 4. The selected cells are according to the priority of the EARFCNs and therefore the cell N from the BCCL of the higher priority EARFCN F2 is at the top of the SIB2DL and the two cells L and M from the intra-frequency EARFCN F1 are the other two cells placed in the SIB2DL. In this example, no cells from the equal priority EARFCN F3 and lower priority EARFCN F4 are selected for SIB2DL.

According an aspect of the present disclosure the SIB2DL may contain the cells from CCL and/or from BCCL for different EARFCNs.

According to an aspect of the present disclosure, the value m may be chosen dynamically such that m=x % of l and where x denotes the percentage for each of the available higher priority EARFCNs and intra-frequency (the same EARFCN as that of the serving cell). The value m may be rounded off to the nearest integer. According to an aspect of the present disclosure, the value of x for intra-frequency may be greater when intra-frequency is one among the highest priority EARFCNs such that m for intra-frequency is always higher in this case than any other inter-frequency. According to an aspect of the present disclosure, the value of x may depend on the number of inter-frequencies configured. For example, the value of x and l may be chosen to select at least one cell from each higher priority inter-frequency EARFCN and at least two cells from the intra-frequency EARFCN.

According to an aspect of the present disclosure, the SIB2DL may also include equal priority EARFCN cells when the number of preferable candidates in higher priority EARFCN is less than l.

The SIB2DL may contain cells of lower priority EARFCNs when the serving cell metric such as RSRP goes below a certain threshold as per cell reselection criteria specified in 3GPP TS 36.304: "Evolved Universal Terrestrial Radio Access (E-UTRA); client terminal Procedures in Idle Mode".

According to an aspect of the present disclosure the client terminal may further prioritize the SIB2 decode of the cells within the SIB2DL based on known a priori information about those cells. Examples of such information include EARFCN priority, Public Land Mobile Network (PLMN) priority, Radio Access Technology (RAT) type etc.

According to an aspect of the present disclosure, to further determine the order of priority for SIB2 decode, the client terminal may use the known a priori information about the cells that are not in the SIB2DL but in the BCCL or CCL and belong to the same EARFCN and/or PLMN and/or Tracking Area of the cells in the SIB2DL. Examples of such information include service level of other known neighbor cells in the same EARFCN and/or PLMN and/or Tracking Area and/or, RAT type. The service level information of a cell may include various access barring information.

According to an aspect of the present disclosure, for the SIB2 decode of the cells in the SIB2DL, the client terminal may establish the first order priority for the cell that belongs to the same RAT, home PLMN, the same EARFCN, the same Tracking Area and with better RSRP and RSRQ among the other cells in the SIB2DL.

According to an aspect of the present disclosure, the best case and worst case time required to decode SIB2 in a given network signal conditions and/or client terminal location may be recorded and from these recorded values an estimate for typical time required for SIB2 decoding may be obtained. Let this dynamically obtained estimate for typical time required for SIB2 decoding for a neighbor cell in a given network signal condition and/or client terminal location be denoted by T'.

Cell reselection may be typically performed only after a fixed duration after the most recent reselection. Cell reselection may be typically performed when the neighbor cell stays in the candidate list consistently for $T_{ReselectionRAT}$ timer duration, i.e., the cell belongs to BCCL. According to an aspect of the present disclosure, the client terminal may decide to do SIB2 decode for only one targeted neighbor cell (TNC) in SIB2DL which may be the next potential cell for reselection. According to an aspect of the present disclosure, the client terminal may perform the SIB2 decode for the TNC at the moment (T−T') so as to avoid the delay in cell reselection trigger for TNC, where T is the time for the possible reselection trigger to happen for TNC and T' is the typical time required for performing the neighbor cell SIB2 decode in a given network signal condition and/or client terminal location for a neighbor cell. This method may reduce decoding of SIB2 for cells to which the cell reselection may be less likely.

According to an aspect of the present disclosure, the client terminal may decide to decode SIB2 for more than one neighbor cell (say l' cells) in the SIB2DL before the next reselection trigger for a TNC in SIB2DL. In such a case, the client terminal may start the SIB2 decode for the selected l' cells at (T−T'×l').

When a client terminal acquires SIB2 of the target cell before reselection, not only it reduces the connection establishment delay, but it also provides the SI modification period in the target cell. Therefore, according to an aspect of the present disclosure, the client terminal may use the SI modification period information to identify the SI Change Notification without monitoring the SIB1 continuously which is the case for a conventional client terminal without the knowledge of SI modification period for the target cell. According to an aspect of the present disclosure, the client terminal may use information received in the SIB2 for effective Discontinuous Reception (DRX) for the very first DRX cycle after reselection since the DRX cycle and SI modification window are known a priori before reselecting the cell. This in turn may reduce power consumption.

The power consumption for the cell reselection according to the aspects of the present disclosure compared to the conventional methods may be lower due to reduced processing after a client terminal performs reselection to a target cell. In the conventional method, the client terminal may open a continuous DL reception window for paging without going into sleep or standby mode due to unknown DRX configuration of the target cell. In cell reselection according to the present disclosure, client terminal may need to do SI decode for one or more neighbor cells in parallel. However, after reselection to a target cell the client terminal may be able to go to sleep or standby mode sooner.

According to an aspect of the present disclosure, the client terminal may use the decoded SIB2 information of a neighbor cell to decide whether the neighbor cell may be considered for reselection. According to an aspect of the present disclosure, the client terminal may avoid cell reselection to a cell which may be barred for one or more network access types for the client terminal. One such example may be if the cell is barred for emergency call and if the client terminal is in need of emergency call, by decoding the SIB2 before reselection the client terminal may avoid reselecting the cell and thereby may reselect to a cell which has no barring for emergency call.

According to an aspect of the present disclosure the client terminal may use the access barring information in SIB2 to make a decision to consider or reject the neighbor cell for reselection. This is possible when the SIB2 of a neighbor cell is decoded less than one SI modification period window before the reselection time and the access bar duration is less than the SI modification period. The client terminal may use these criteria to ensure that after reselecting/camping on to the neighbor cell, the SIB2 would not have changed during the course of cell reselection. Therefore, the knowledge of SIB2 prior to the cell reselection may help avoid reselecting to a cell that may be barred for access/service.

According to an aspect of the present disclosure if the client terminal decodes the SIB2 before reselection to a cell, then it may start using any scheduling information received in the SIB2 immediately after the reselection. The use of the available SIB2 information may increase the probability of availing the services enabled by the network sooner and may improve the user experience. One such example of the use case is the "MBSFN-SubframeConfigList" information received in the SIB2 which may be used by the client terminal to know the Multimedia Broadcast Single Frequency Network (MBSFN) sub frames in the target cell immediately after reselection without any delay in decoding the SIB2 after the reselection.

Although the various aspects of the present disclosure have been described and illustrated for the case of 3GPP LTE wireless communication system, the aspects of the present disclosure are applicable to other wireless communication systems such as 3GPP Wideband Code Division Multiple Access (WCDMA), Global System for Mobile Communications (GSM), Code Division Multiple Access (CDMA), systems based on an IEEE 802.16 wireless communication standard, or any other cellular wireless communication system. Furthermore, the method described herein may be especially more useful in the case of client terminal with capability for multiple Radio Access Technologies (multi-RATs) such as LTE, WCDMA, GSM, CDMA, etc. In case of a multi-RAT client terminal, the decoding of the SI that provides the required common control channel parameters may help improve the inter-RAT cell reselection in a manner similar to the case of intra-RAT cell reselection as described herein for the particular case of 3GPP LTE.

By way of example only, the above-described method may be implemented in a receiver, e.g., a user device such as a wireless mobile station (MS) 12 as shown in FIG. 1.

Figure 5:
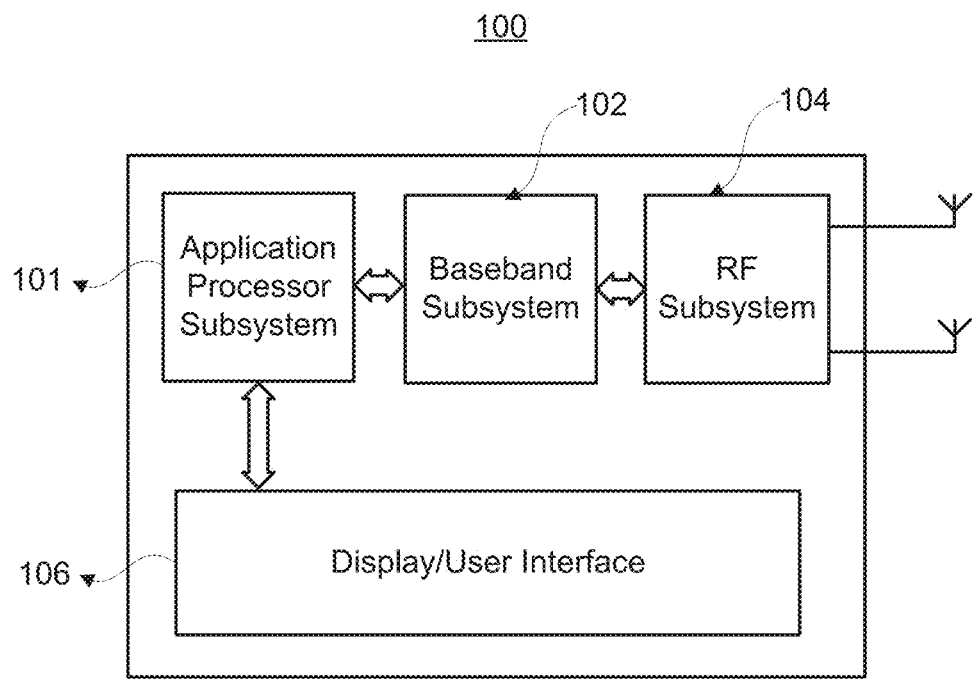
FIG. 5 illustrates a wireless mobile station diagram, which may be employed with aspects of the disclosure described herein.

As shown in FIG. 5, MS 100 may include an application processor subsystem 101, baseband subsystem 102 and a radio frequency (RF) subsystem 104 for use with a wireless communication network. A display/user interface 106 provides information to and receives input from the user. By way of example, the user interface may include one or more actuators, a speaker and a microphone. In some mobile devices, certain combination of the application processor subsystem 101, the baseband subsystem 102 and the RF subsystem 104 are all integrated as one integrated chip.

Figure 6:
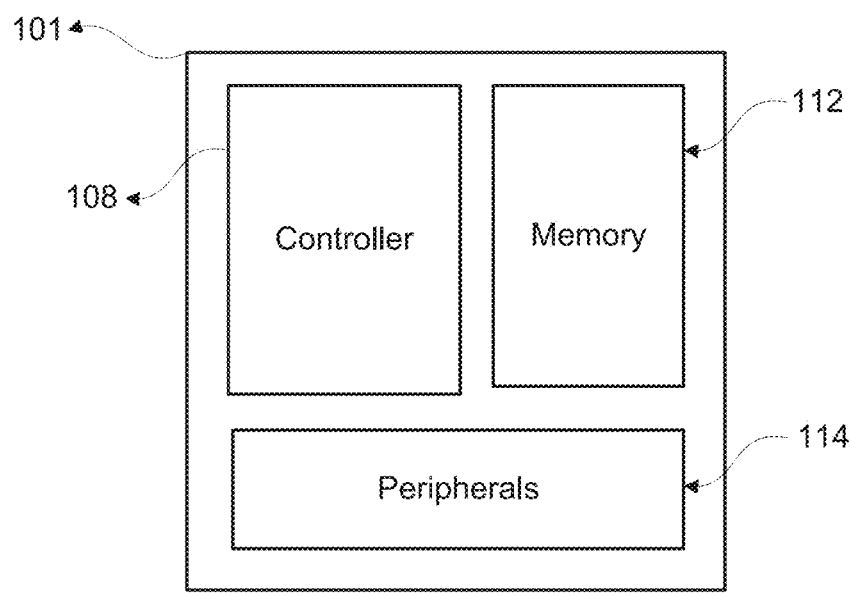
FIG. 6 illustrates an application processor subsystem for a wireless mobile station, which may be employed with aspects of the disclosure described herein.
Figure 7:
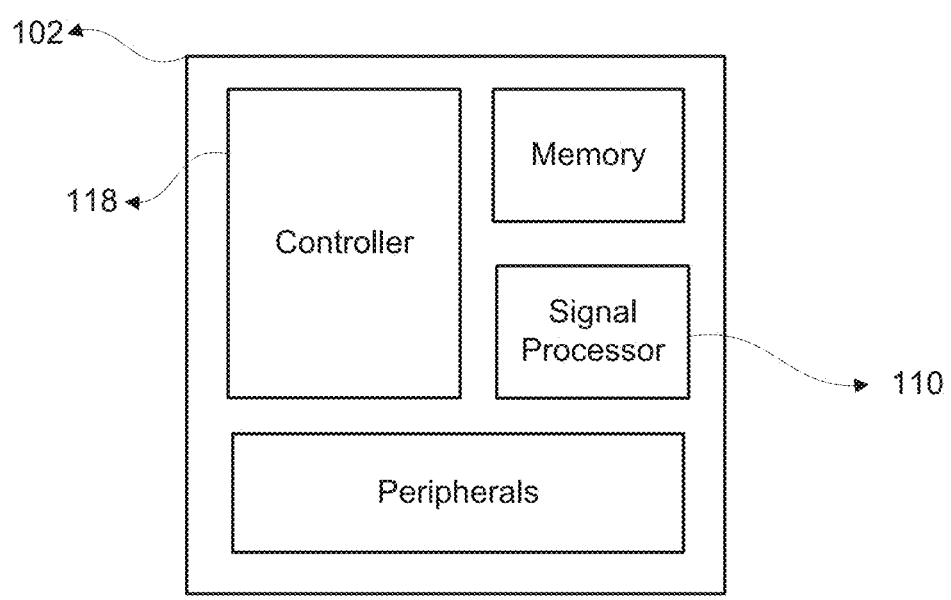
FIG. 7 illustrates a baseband subsystem for a wireless mobile station, which may be employed with aspects of the disclosure described herein.
Figure 8:
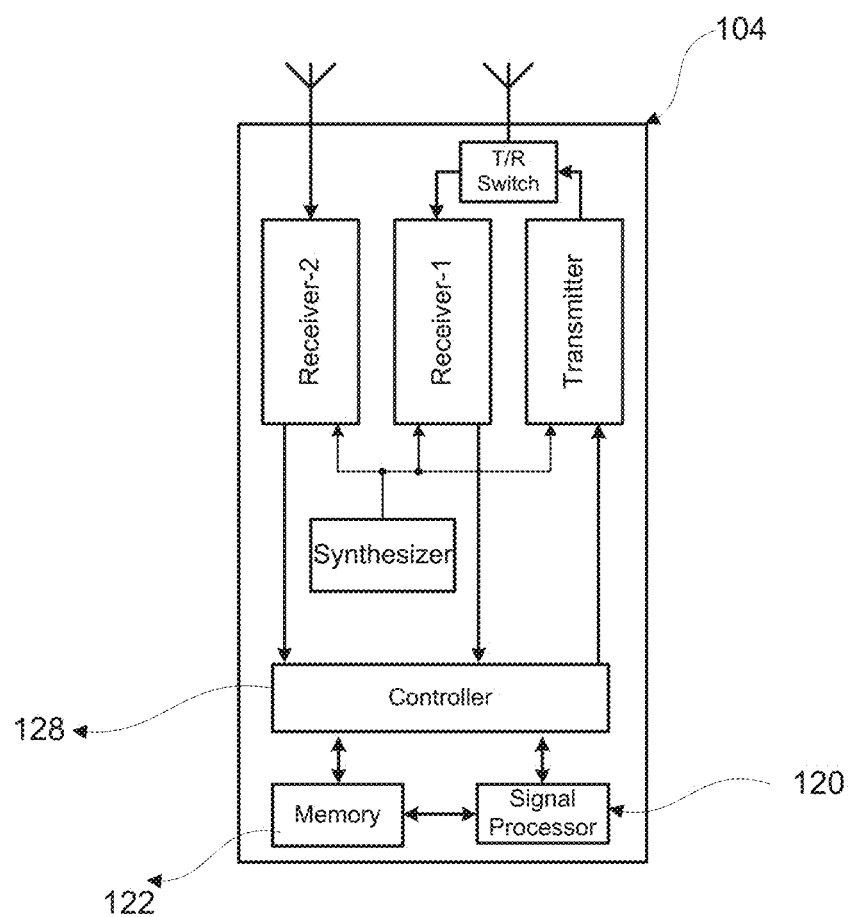
FIG. 8 illustrates a Radio Frequency (RF) subsystem for a wireless mobile station, which may be employed with aspects of the disclosure described herein.

The application processor subsystem 101 as shown in FIG. 6 may include a controller 108 such as a microcontroller, another processor or other circuitry. The baseband subsystem 102 as shown in FIG. 7 may include a controller 118 such as a microcontroller or other processor. The RF subsystem 104 as shown in FIG. 8 may include a controller 128 such as a microcontroller, another processor or other circuitry. The controller 108 in FIG. 6 desirably handles overall operation of the MS 100. This may be done by any combination of hardware, software and firmware running on the controller 108. Such a combination of hardware, software and firmware may embody any methods in accordance with aspects of the present disclosure.

Peripherals 114 in FIG. 6 such as a full or partial keyboard, video or still image display, audio interface, etc may be employed and managed through the controller 108.

Aspects of the present disclosure may be implemented in firmware of the controller 108 of the application processor in FIG. 6 and/or the controller 118 of the baseband subsystem of FIG. 7. In another alternative, aspects of the present disclosure may also be implemented as a combination of firmware and hardware of the application processor subsystem 101 of FIG. 6 and/or the baseband subsystem 102 of FIG. 7. For instance, a signal processing entity of any or all of the FIG. 7 may be implemented in firmware, hardware and/or software. It may be part of the baseband subsystem, the receiver subsystem or be associated with both subsystems. In one example, the controller 118 and/or the signal processor 110 of FIG. 7 may include or control the protocol entity circuitry. The software may reside in internal or external memory and any data may be stored in such memory. The hardware may be an application specific integrated circuit (ASIC), field programmable gate array (FPGA), discrete logic components or any combination of such devices. The terms controller and processor are used interchangeably herein.

The consumer electronics devices that may use the aspects of the disclosure may include smartphones, tablets, laptops, gaming consoles, cameras, video camcorders, TV, car entertainment systems, etc.

Although aspects of the disclosure herein have been described with reference to particular embodiments, it is to be understood that these embodiments are merely illustrative of the principles and applications of the aspects of the present disclosure. It is therefore to be understood that numerous modifications may be made to the illustrative embodiments and that other arrangements may be devised without departing from the spirit and scope of the aspects of the present disclosure as defined by the appended claims. Aspects of each embodiment may be employed in the other embodiments described herein.

The invention claimed is:

1. A method for cell reselection in a wireless communication system, the method comprising:

controlling, by a processing device at a client terminal, at least one of
  when the client terminal does not have a valid System Information Block 2 (SIB2) for at least one Candidate Cell (CC) in a Candidate Cells List (CCL), determining to decode a given SIB2 for at least one given CC in the CCL while performing a predetermined cell reselection process, in which the CCL includes each identified neighbor cell of a current serving cell of the client terminal that satisfies cell reselection criteria as a result of a priority based cell reselection evaluation; or
  when the client terminal does not to have a valid SIB2 for at least one Better Candidate Cell (BCC) in a Better Candidate Cells List (BCCL), determining to decode a second given SIB2 for at least one given BCC in the BCCL while performing the predetermined cell reselection process, in which the BCCL includes each CC in the CCL that satisfies the cell reselection criteria consistently for the period $T_{ReselectionRAT}$.

2. The method of claim 1, further comprising:
controlling, by the processing device, at least one of
  maintaining a CCL for each given Evolved Absolute Radio Frequency Channel Number (EARFCN), wherein a number m of CC selected for SIB2 decode from the CCL of the each given EARFC is a same or different; or
  maintaining a BCCL for each of the given EARFCN, wherein a number m2 of BCC selected for SIB2 decode from the BCCL of the each given EARFC is a same or different,
wherein the number m is different or same as the number m2.

3. The method of claim 2, further comprising:
controlling, by the processing device, generating a new list of potential candidate cells for performing SIB2 decoding while the client terminal remains in the current serving cell.

4. The method of claim 3, wherein the new list as SIB2DL includes cells from at least one given CCL or given BCCL for different ones of the EARFCNs.

5. The method of claim 4, wherein the SIB2DL has a size l equal to a number of cells for which the SIB2 decoding is performed, wherein a value $m_i$ of each of m and m2 is dynamically selected such that $m_i = x$ % of l, and wherein x is a percentage for each available higher priority EARFCN and intra-frequency EARFCN.

6. The method of claim 5, wherein the value m is rounded off to a nearest integer.

7. The method of claim 5, wherein a value of x for a given intra-frequency EARFCN is at least a predetermined value when the given intra-frequency EARFCN is of a plurality of given highest priority EARFCN.

8. The method of claim 5, wherein a value of x is in accordance with a number of inter-frequencies.

9. The method of claim 4, wherein the SIB2DL includes a given cell from an equal priority EARFCN when a number of preferable candidates in a higher priority EARFCN is less than l.

10. The method of claim 4, further comprising:
controlling, by the processing device, prioritizing SIB2 decoding of given second cells within the SIB2DL based on predetermined information about the given second cells.

11. The method of claim 4, further comprising:
controlling, by the processing device, prioritizing SIB2 decoding using predetermined information about given second cells (i) not in the SIB2DL and (i) in the BCCL or CCL and belonging to at least one of a same EARFCN, Public Land Mobile Network (PLMN) priority or Tracking Area of the cells in the SIB2DL.

12. The method of claim 4, further comprising:
controlling, by the processing device, SIB2 decoding cells in the SIB2DL by determining a first order priority for a second cell belonging to a same Radio Access Technology RAT, a home Public Land Mobile Network (PLMN), a same EARFCN and a same Tracking Area and having a better Reference Signal Received Power (RSRP) and Reference Signal Received Quality (RSRQ) among other cells in the SIB2DL.

13. The method of claim 4, further comprising:
controlling, by the processing device, determining to perform SIB2 decoding for only one targeted neighbor cell (TNC) in the SIB2DL as a next potential cell for reselection.

14. The method of claim 13, wherein the SIB2 decoding for the TNC is performed at a time T–T', wherein T is a time for the possible reselection trigger for the TNC and T' is a typical time required for performing SIB2 decoding in at least one of a given network signal condition or client terminal location for a given neighbor cell.

15. The method of claim 4, further comprising:
controlling, by the processing device, deciding to perform SIB2 decoding for l' neighbor cells in the SIB2DL before a next reselection trigger for a targeted neighbor cell (TNC) in the SIB2DL.

16. The method of claim 15, wherein the SIB2 decoding is started for the l' neighbor cells at a time equal to T–T'×l', wherein T is a time for the possible reselection trigger for the TNC and wherein T' is a typical time required for performing SIB2 decoding in at least one of a given network signal condition or client terminal location for a given neighbor cell.

17. The method of claim 1, further comprising:
controlling, by the processing device, performing SIB2 decoding for a plurality of given CC of the CCL while the client terminal remains in the current serving cell.

18. The method of claim 1, further comprising:
controlling, by the processing device, performing SIB2 decoding for a plurality of given BCCs of the BCCL while the client terminal remains in the current serving cell.

19. The method of claim 1, further comprising:
controlling, by the processing device,
  recording, as recorded values, a best case time and worst case time to decode SIB2 in at least one of a given network signal condition or client terminal location; and
  from the recorded values, estimating a typical time required for SIB2 decoding.

20. The method of claim 1, further comprising:
controlling, by the processing device, using information received in a third given SIB2 for effective Discontinuous Reception (DRX) for a first DRX cycle after cell reselection.

21. The method of claim 1, further comprising:
controlling, by the processing device, using decoded SIB2 information of a given neighbor cell to determine whether the given neighbor cell is to be considered for reselection.

22. The method of claim 1, further comprising:
controlling, by the processing device, avoiding cell reselection to a cell which is barred for at least one network access type for the client terminal.
23. The method of claim 1, further comprising:
controlling, by the processing device, using access barring information in a third given SIB2 to decide to consider or reject a given neighbor cell for reselection.
24. The method of claim 1, further comprising:
controlling, by the processing device, when a third given SIB2 is decoded before reselection to another cell, starting using any scheduling information received in the third given SIB2 immediately after the reselection.
25. An apparatus for cell reselection in a wireless communication system, the apparatus comprising:
circuitry configured to control at a client terminal, at least one of
when the client terminal does not have a valid System Information Block 2 (SIB2) for at least one Candidate Cell (CC) in a Candidate Cells List (CCL), determining to decode a given SIB2 for at least one given CC in the CCL while performing a predetermined cell reselection process, in which the CCL includes each identified neighbor cell of a current serving cell of the client terminal that satisfies cell reselection criteria as a result of a priority based cell reselection evaluation; or
when the client terminal does not to have a valid SIB2 for at least one Better Candidate Cell (BCC) in a Better Candidate Cells List (BCCL), determining to decode a second given SIB2 for at least one given BCC in the BCCL while performing the predetermined cell reselection process, in which the BCCL includes each CC in the CCL that satisfies the cell reselection criteria consistently for the period $T_{ReselectionRAT}$.

26. A wireless communication device comprising:
a receiver to receive a wireless communication; and
a processing device configured for cell reselection, wherein the processing device is configured to control at least one of:
when the wireless communication device does not have a valid System Information Block 2 (SIB2) for at least one Candidate Cell (CC) in a Candidate Cells List (CCL), determining to decode a given SIB2 for at least one given CC in the CCL while performing a predetermined cell reselection process, in which the CCL includes each identified neighbor cell of a current serving cell of the wireless communication device that satisfies cell reselection criteria as a result of a priority based cell reselection evaluation; or
when the wireless communication device does not to have a valid SIB2 for at least one Better Candidate Cell (BCC) in a Better Candidate Cells List (BCCL), determining to decode a second given SIB2 for at least one given BCC in the BCCL while performing the predetermined cell reselection process, in which the BCCL includes each CC in the CCL that satisfies the cell reselection criteria consistently for the period $T_{ReselectionRAT}$.

* * * * *